Jan. 1, 1929.
O. U. ZERK
1,697,217
LUBRICANT FITTING
Filed April 19, 1924
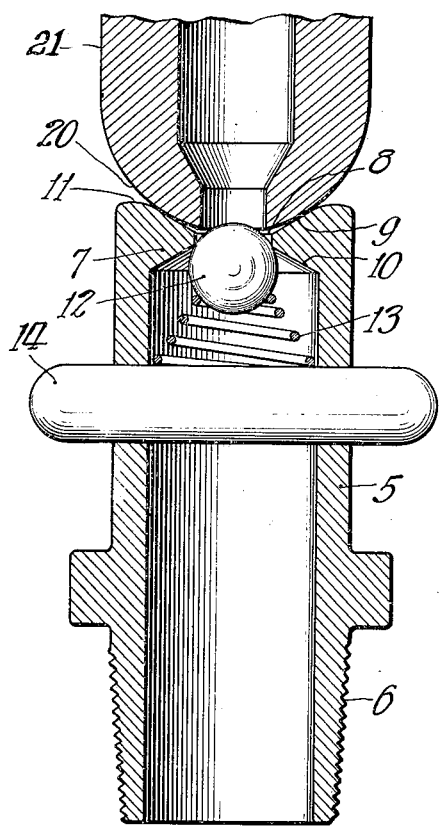
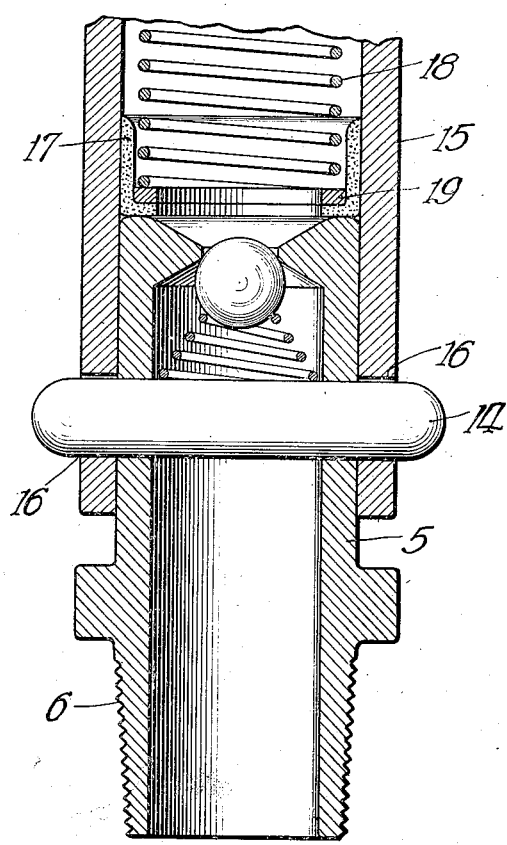
Inventor.
Oscar U. Zerk.
Earl N. Pierce
Atty.

Patented Jan. 1, 1929.

1,697,217

UNITED STATES PATENT OFFICE.

OSCAR U. ZERK, OF CLEVELAND, OHIO, ASSIGNOR TO ALEMITE MANUFACTURING CORPORATION, OF CHICAGO, ILLINOIS, A CORPORATION OF DELAWARE.

LUBRICANT FITTING.

Application filed April 19, 1924. Serial No. 707,699.

My invention relates to improvements in lubricating fittings, and is particularly concerned with a novel type of fitting, forming a part of a lubricating system comprising a plurality of such fittings and a lubricant compressor for supplying lubricant under pressure to the fittings, the compressor embodying some means for making sealed contact with the fitting so that lubricant under pressure can be transmitted from the compressor to the fittings.

One of the objects of my invention is to provide a fitting, forming part of a lubricating system such as described above, and particularly adapted to be used with a compressor having a coupling device which includes a gasket, or sealing member, that is subjected to the pressure of the lubricant in such manner that the sealing effect increases with increase in pressure on the lubricant.

In my present invention the sealing contact is formed between the fitting and gasket, or sealing member, along a comparatively narrow annular band, adjacent the edge of the outer end of the fitting, so that the pressure per unit area on the contacting surfaces of the fitting and the gasket, or sealing member, is greater than would be the case if the gasket or sealing member contacted with substantially the entire outer end of the fitting.

Another object of my invention is to provide a fitting which is constructed so that it is easier to clean the contacting portion of the fitting than is the case with that type of fitting which has a comparatively flat end.

With the fitting described herein it is necessary to clean only the extreme marginal portion of the contacting end of the fitting, and, if by accident, dirt is not removed from the remaining portions of the contacting end, it will not interfere with the sealed contact between the fitting and the gasket, or sealing member, referred to above.

A still further object of my invention is to provide a fitting forming a part of a system in which the seal between the fitting and the compressor discharge device is formed by two contacting metal surfaces, the arrangement being such that a complete seal is effected even though the fitting is approached from different angles relative to the fitting.

Other objects of my invention are to provide a fitting of the above character which is simple of construction, rugged and economical to manufacture.

Other objects of my invention will appear as this description progresses, reference being had to the accompanying drawings in which—

Fig. 1 is a longitudinal section through a preferred embodiment of my invention, and through the discharge portion, or coupling member, of a compressor which makes use of a gasket, or other sealing device, subjected to the pressure of the lubricant; and Fig. 2 is a similar view, except that it illustrates my fitting in combination with the nozzle, or discharge device, of a compressor, so constructed that the contacting surfaces of the fitting and compressor are metallic surfaces.

Referring for the present to Fig. 1, the fitting comprising my invention is formed of a tubular member 5, which is preferably made of brass, but which can be made of any desired metal, having screw threads 6, or other suitable means at one end, by which the fitting can be secured to the bearing to be lubricated. At its other end the tubular member is provided with inwardly extending annular flanges forming the port 8 for the passage of lubricant. The flange is beveled inwardly on both sides as shown in Fig. 1 to form outer and inner seats 9 and 10, respectively. The outer seat is surrounded by a narrow, annular contact surface 11, the purpose of which will be referred to later on.

A ball closure 12 is provided for the port 8, and is yieldingly held in position by means of the compression spring 13, which is confined between the ball closure 12 and the intermediate portion of the pin 14, which extends through and beyond both sides of the tubular member 5.

When my improved fitting is used with that type of lubricant compressor, which is of well known construction, and which comprises a coupling member formed in part of a sleeve 15, having bayonet slots 16 formed at its outer end, and having a cup leather or sealing device 17, slidable therein and yieldingly urged outwardly by means of a compression spring 18 bearing against a washer 19 contacting with the cup leather or sealing device as shown in Figure 1, the principal contact with the sealing device, or cup leather, takes place along a narrow annular band or surface adjacent the edge of the outer end of the fitting, whereas the central portion of the cup leather, or sealing device, contacts more or less loosely with the central portion of the outer end of the fitting.

From the above description it will be apparent that any pressure, exerted by the lubricants or the compression spring 18, upon the cup leather, or sealing device, will be exerted upon a comparatively small area of the annular contact band or surface surrounding the outer end of the fitting, so that the pressure, per unit area, exerted upon the contacting surfaces of the fitting and the sealing member, will be greater than would be the case if these two members contacted throughout their opposing surfaces. It will also be apparent that even though dust or dirt may lodge on the portions of the outer ends of the fitting, immediately adjacent the port 8, such dirt or dust will not seriously interfere with the sealing action between the gasket and the fitting, nor will it be conveyed into the bearing, because it is not in the path of the moving lubricant.

With the fitting such as described all that is necessary to do, before connecting a coupling member such as described, with it, is to clean the portion of the fitting immediately adjacent the port 8, and the exposed portion of the closure 12, and, in addition, a narrow annular contact surface at the outer edge of the end of the fitting. This can be easily and quickly done with any suitable brush or cloth.

My improved fitting can also be used with a compressor having a discharge portion or nozzle similar to that illustrated in Fig. 2, in which the extreme outer end 20 of the nozzle, or discharge device 21, is spherical in contour, so that it will contact with the depressed conical surface at the outer end of the fitting along a circle. It will also be apparent that the nozzle or discharge device 21 can occupy different angles relative to the fitting, without destroying the sealing contact between its spherical surface 20, and the depressed conical surface of the fitting. This is of importance as it enables the operator to approach the fittings from various angles and thus makes it possible for the operator to reach bearings or fittings located at more or less inaccessible positions.

The angles defining the outer and inner faces 9 and 10, respectively, are each approximately 120 degrees. This angle is the preferred one but it will of course be understood that it can be varied without departing from the spirit of my invention. It should be noted that the flange 7 increases in thickness toward the outer edge. This is of particular value where nozzles such as 21 are used, because nozzles of this type are almost universally used with compressors constructed in such manner that the pressure on the lubricant is developed by pushing upon the compressor, or a portion, thereof, in the direction of the fitting. This, of course, means that the annular flange 7, when such a compressor is used, must bear the entire force exerted upon the compressor. By making the flange 7 taper outwardly, as shown in the drawings, its strength is materially increased, so that it is strong enough to bear any pressure that may be exerted thereupon without material, or substantial, deflection and with no deformation.

While I have described the details of construction of the preferred embodiment of my invention, it is to be clearly understood that my invention is not limited to these details, but is capable of other adaptations and modifications within the scope of the appended claim.

I claim:

In a lubricating apparatus of the class described a lubricant receiving nipple comprising a tubular body having an outlet and provided with means for securing said body to a part to be lubricated, and an inlet end adapted to form a lubricant-tight connection with the discharge nozzles of high pressure lubricant compressors, said inlet end having a peripheral flat portion adapted to form a seal with one type of discharge nozzle, and a central conical portion adapted to form a seal with a second type of discharge nozzle by contact therewith along the conical surface of the fitting between the bore and periphery thereof, a pin extending through said tubular body and projecting from both sides thereof, and a check valve in said tubular body and normally closing the inlet thereof.

In testimony whereof I have hereunto signed my name this 1st day of April, 1924.

OSCAR U. ZERK.